United States Patent [19]

Yovanovich

[11] 3,917,439

[45] Nov. 4, 1975

[54] APPARATUS FOR PRODUCING STOCK OF SYNTHETIC THERMOPLASTIC MATERIAL BY CONTINUOUS MOLDING

[76] Inventor: Joseph T. Yovanovich, 1415 Orchard Way, Rosemont, Pa. 19010

[22] Filed: Mar. 28, 1974

[21] Appl. No.: 455,617

[52] U.S. Cl............. 425/4 C; 425/371; 425/817 C; 264/51
[51] Int. Cl.²........................................ B29D 27/04
[58] Field of Search................ 425/4 C, 371, 817 C; 264/51

[56] References Cited
UNITED STATES PATENTS

| | | | |
|---|---|---|---|
| 3,111,709 | 11/1963 | Reed | 425/4 C |
| 3,178,768 | 4/1965 | Edberg | 425/4 C |
| 3,711,231 | 1/1973 | Chess et al. | 425/4 C X |
| 3,734,668 | 5/1973 | Porter | 425/4 C X |
| 3,736,089 | 5/1973 | Ross et al. | 425/371 X |
| 3,800,018 | 3/1974 | Charpentier | 425/4 C X |

*Primary Examiner*—R. Spencer Annear
*Attorney, Agent, or Firm*—Louis V. Schiavo

[57] ABSTRACT

Mutually overlying runs of two endless belts form therebetween a mold channel open at both ends. The mold forming runs move continuously in the same direction at the same rate of speed thereby to draw a sheet of material from a roll thereof downstream into and through the mold channel. The sheet material enters the mold channel in the form of a sleeve charged with only partially expanded granules of a synthetic thermoplastic material containing a heat expanding agent. As the charged sleeve moves downstream through the mold channel steam under pressure is introduced directly into the mold cavity thereby to fully expand the granules and covert the mass thereof into a coherent foamed agglutinated body which takes the shape of the mold cavity.

3 Claims, 6 Drawing Figures

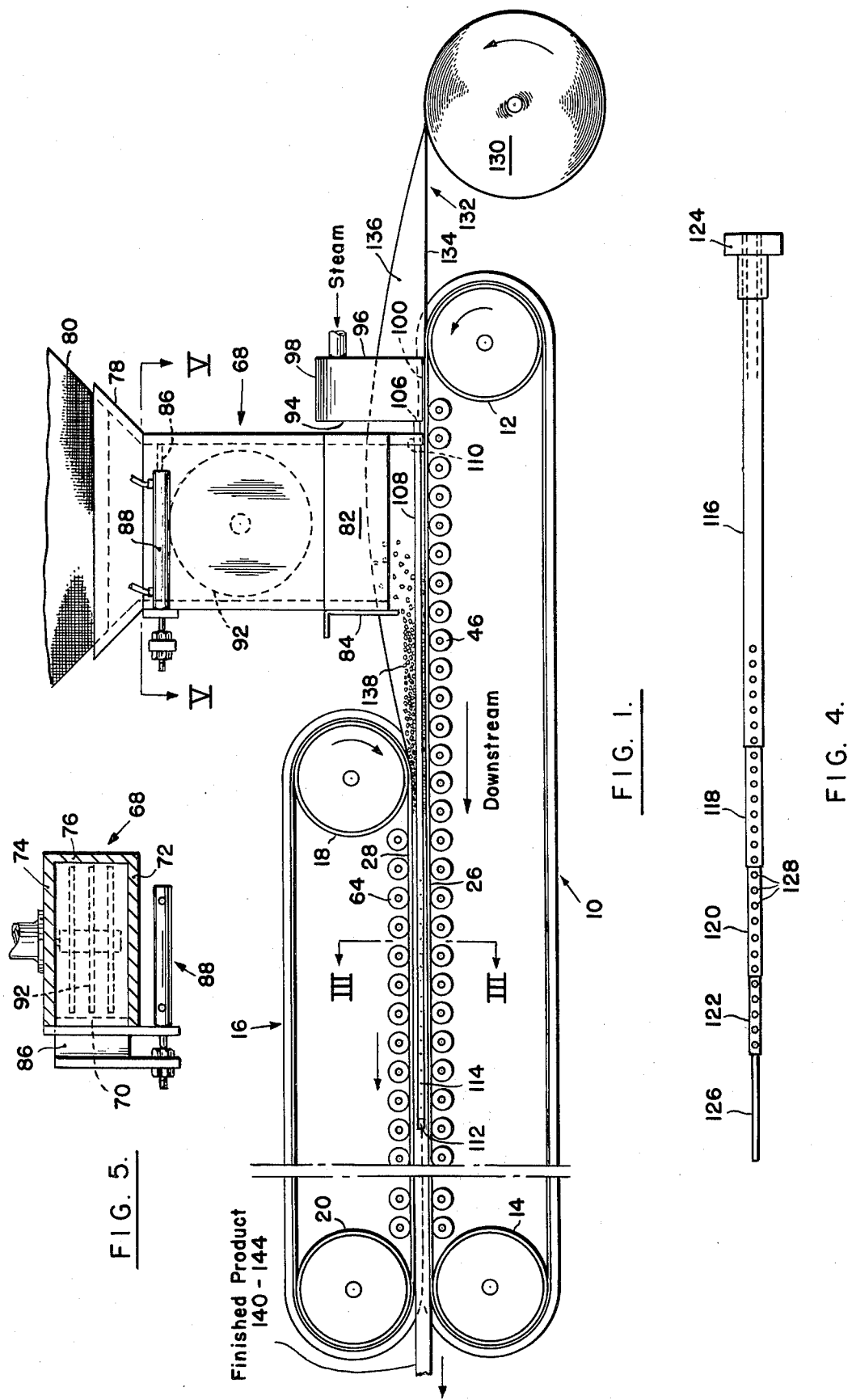

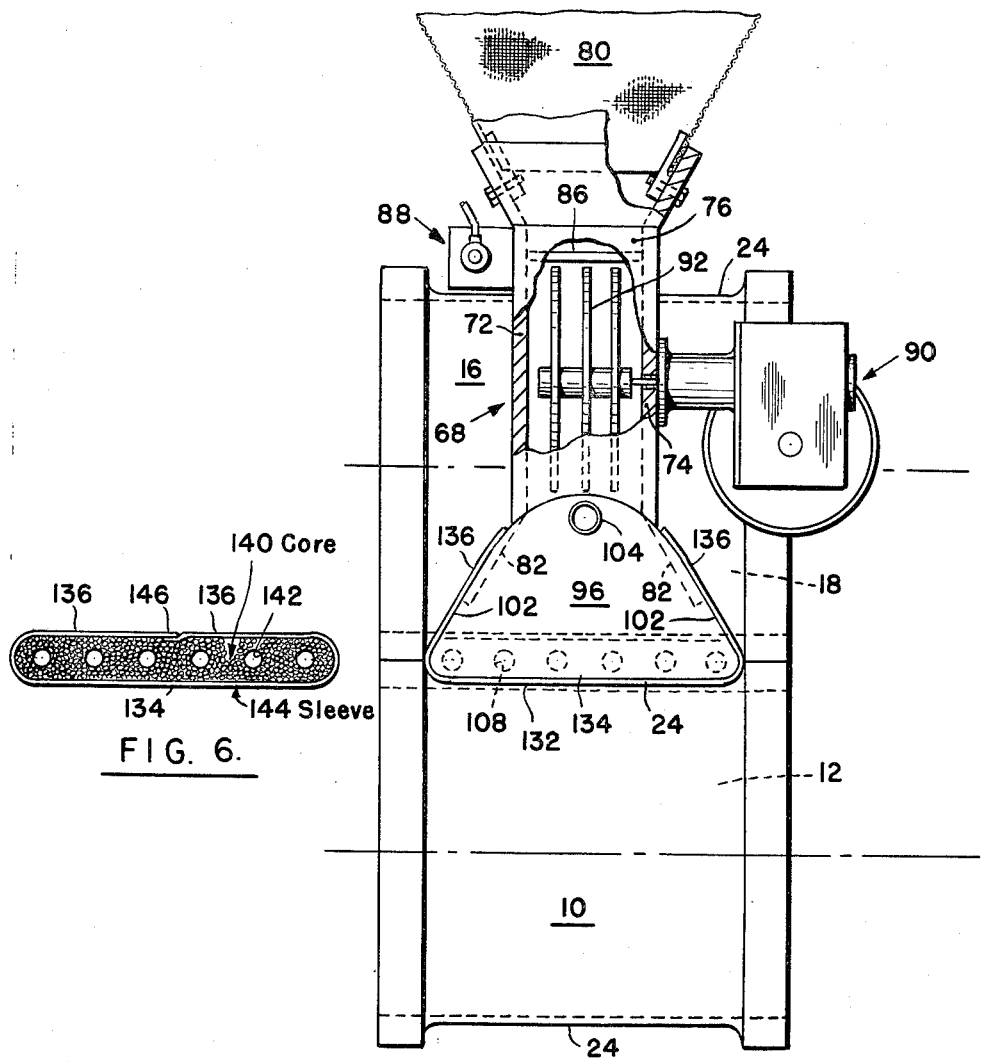
FIG. 6.
FIG. 2.
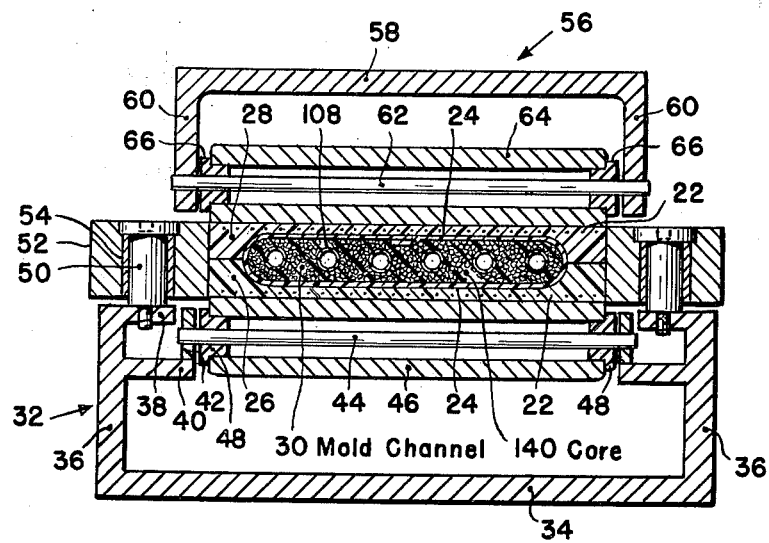
FIG. 3.

APPARATUS FOR PRODUCING STOCK OF SYNTHETIC THERMOPLASTIC MATERIAL BY CONTINUOUS MOLDING

BACKGROUND OF THE INVENTION

1. Field of the Invention

This invention relates to a method and apparatus for the continuous production of stock of any desired length provided with a core consisting of polymeric material which is expansible by the application of heat to form a foamed, coherent porous structure, and with a sheet of polymeric material extending about the core thereby to form a sleeve tightly encasing the same.

2. Description of the Prior Art

U.S. Pat. No. 3,736,081, issued to Joseph T. Yovanovich, May 29, 1973, discloses apparatus for the continuous production of slabs or sheets of any desired length, composed of synthetic thermoplastic granules containing a heat expansible agent, or other polymeric material which is expansible by the application of heat, to form a foamed, coherent porous structure. However, the arrangement of the apparatus has not proved to be entirely satisfactory because a steam chest is disposed over the upper wall of the mold channel and a second steam chest is disposed under the lower wall of the mold channel. Steam from these chests is introduced into the mold cavity through openings in the walls aforesaid. To force the steam through the openings and to the center of the mass of granules of polymeric material in the mold cavity a steam pressure in the order of fifteen pounds per square inch is required. Unfortunately, however, the difficulty of achieving steam-tight joints between adjoining sections of the apparatus aforesaid results in such a loss of steam that only a pressure in the order of five pounds per square inch may be realized. Accordingly, when steam in sufficient quantity does not reach the center of the mass of polymeric material, the granules there do not expand as intended, and the result is an inferior product.

SUMMARY OF THE INVENTION

Mutually overlying runs of two endless belts form therebetween a mold channel open at both ends. The mold forming runs move continuously in the same direction at the same rate of speed thereby to draw a sheet of material from a roll thereof downstream into and through the mold channel. The sheet material enters the mold channel in the form of a sleeve charged with partially expanded granules of a synthetic thermoplastic material containing a heat expanding agent.

As the sheet material moves downstream from the supply roll toward the mold channel it is folded over to form the sleeve. However, before the sleeve is fully formed it is suitably charged with granules of a synthetic thermoplastic material containing a heat expanding agent. As the fully formed sleeve charged as aforesaid moves through the mold channel, steam is injected from a source thereof directly into the mold cavity and the mass of granules to expand the granules and convert the mass thereof into a coherent foamed agglutinated body which presses the sleeve against the walls of the mold cavity. The steam passes from the center of the mold cavity outwardly toward the walls thereof and thereby thoroughly penetrates the porous mass of granules without any necessity for building up a steam pressure in the order of fifteen pounds per square inch. Thus a superior product is produced without any loss of steam.

In addition, steam supply tubes extend into the mold cavity through the upstream end thereof, and steam is injected into the mold cavity through perforations in the tubes. As a consequence, the stock produced by the apparatus is provided with longitudinally extending openings in the core thereof. As the steam condenses, the resulting moisture is retained by the porous core of synthetic thermoplastic material, and it is desirable to get rid of it. This may be effected by cutting the stock produced by the apparatus into short lengths, for example, to form cloth-board reels, and drawing the moisture from the reels through said openings by suction.

BRIEF DESCRIPTION OF THE DRAWINGS

FIG. 1 principally is a schematic longitudinal section through apparatus constructed in accordance with the invention, a fragment at the head of the apparatus being a side elevation;

FIG. 2 is an enlarged schematic view looking at the upstream end of the apparatus shown in FIG. 1, part being broken away for the sake of clarity;

FIG. 3 is an enlarged section on lines III—III in FIG. 1;

FIG. 4 is an enlarged view of a modified steam supply tube;

FIG. 5 is a section on lines V—V in FIG. 1; and

FIG. 6 is an enlarged section of the final product or stock produced by the apparatus.

DESCRIPTION OF THE PREFERRED EMBODIMENT

The exemplary method and apparatus described hereinafter are adapted particularly for the production of stock of any desired length, which may be cut into predetermined short lengths and used as cloth-board reels. However, it will be understood that the following description is not addressed to the scope of the invention for the method and apparatus aforesaid may take a variety of forms.

Referring particularly to FIGS. 1 and 3, apparatus constructed in accordance with the invention is provided with an endless belt 10 trained about a head pulley 12 and a tail pulley 14, and with an endless belt 16 trained about a head pulley 18 and a tail pulley 20. The belts are molded urethane belts with a plurality of reinforcing cords 22 embedded therein, and with outer surfaces depressed as at 24. The belt 16 is disposed in overlying relation to the belt 10; the upper run 26 of the belt 10 and the lower run 28 of the belt 16 are disposed in mutually overlying relation so that their opposing depressed surfaces 24 conjointly afford a mold channel or cavity 30.

Referring particularly to FIG. 3, a frame 32 underlies the upper run 26 of the belt 10 and extends from the head pulley 12 to the tail pulley 14. The frame is provided with a base wall 34 and raised sidewalls 36 terminating in inwardly turned flanges 38. Intermediate the base wall 34 and the flanges 38, the sidewalls 36 respectively are provided with inwardly extending flanges 40, each of which carries an upstanding bar 42. Spanning the opposed bars 42 is a series of rods 44 respectively mounting a series of close spaced rollers 46. Each roller comprises a hollow cylindrical member carried by a pair of suitable bearings 48 mounted on the rod 44. Seated upon each of the flanges 38 is a series of pintles 50 respectively mounting a series of close spaced rollers 52. Each roller is provided with a suitable bushing 54 and turns about the main body of the pintle. The lower extremity of the pintle is reduced in diameter and threaded into the flange 38, while the upper extremity of the pintle is enlarged in diameter to curb movement of the roller axially of the pintle.

Still referring particularly to FIG. 3, a frame 56 overlies the lower run 28 of the belt 16 and extends from the head pulley 18 to the tail pulley 20. The frame is provided with a base wall 58 and depending sidewalls 60. Spanning the opposed sidewalls 60 is a series of rods 62 respectively mounting a series of close spaced rollers 64. Each roller comprises a hollow cylindrical member carried by a pair of suitable bearings 66 mounted on the rod 62. The upper run 26 of the belt 10 and the lower run 28 of the belt 16 are both carried by the series of rollers 46, and the several rollers 46, 64 and 52 coact to guide the mutually overlying belt runs 26 and 28 so that the depressed surfaces 24 thereof register to form the mold channel 30. Preferably, suitable structural means (not shown) is provided for supporting the frames 32 and 56 upon a floor of the building which houses the apparatus.

Overlying the head or upstream end of the belt 10 is a hopper 68 which, as shown particularly in FIG. 5, is rectangular in transverse section. The hopper 68 is provided with a front wall 70, opposed sidewalls 72 and 74 and a rear wall 76. Extending about the upper end of the hopper is a flange 78 in the form of a truncated pyramid which is inverted for connection to the discharge opening in the bottom of a bin 80. Below the flange 78, the front wall 70 and the rear wall 76 are planar and vertically disposed throughout. The opposed sidewalls 72 and 74 also are planar and vertically disposed, but the lower end portions thereof diverge downwardly and outwardly, as at 82. The fromt wall 70 and the sidewalls 72 and 74 terminate a substantial distance above the upper run 26 of the belt 10, whereas the rear wall 76 extends downwardly to a point just short of the depressed surface 24 in the upper run 26 of the belt 10. A gate 84 is mounted upon the front wall 70 and is provided with means for selectively adjusting the vertical position thereof for controlling the volume of material discharged from the hopper. At the top of the hopper, just below the flange 78 is a slide gate 86 extending through the front wall 70 and operated by a pneumatic double acting piston and cylinder arrangement, generally designated 88, for cutting off flow of material from the bin 80 to the hopper 68.

Affixed to the outer side of the sidewall 74 of the hopper 68 is an electric motor and speed reducer unit 90. The output shaft of the speed reducer extends through the sidewall 74 and into the hopper and mounts three axially spaced discs 92 for agitating the material in the hopper 68.

Mounted upon the rear wall 76 of the hopper 68 is a manifold provided with a main body including an upright front wall 94, an upright rear wall 96, a rounded top wall 98, a horizontally extending bottom wall 100 disposed just above the depressed surface 24 of the upper run 26 of the belt 10, and opposed sidewalls 102 diverging downwardly and outwardly from the top wall 98 and disposed in coplanar relation respectively to the downwardly and outwardly diverging lower end portions 82 of the sidewalls 72 and 74 of the hopper 68. The rear wall 96 is provided with an opening 104 for the supply of steam under pressure to the manifold, and the front wall 94 is provided with a series of openings 106 for the supply of steam under pressure from the manifold to a set of tubular members 108, now to be described.

As indicated schematically in FIGS. 1–3, the axes of the tubular members 108 are disposed in a plane which is coincident with the interface between the upper run 26 of the belt 10 and the lower run 28 of teh belt 16. The upstream ends of the tubular members are connected to the front wall 94 of the steam manifold and are thereby respectively disposed in registry with the openings 106 therein, and with a series of openings 110 in the rear wall 76 of the hopper 68. Each tubular member 108 is cantilevered from the manifold and extends downstream therefrom freely through one of the openings 110 and into the mold cavity 30.

The tubular members 108 preferably are provided with a jacket or coating of antifriction material (not shown), such as Teflon, and each is tapered from the given diameter at its upstream end to a smaller diameter at its downstream end. The downstream end is closed by a plug 112. The section of the tubular member which extends into the mold channel 30 is provided with perforations 114 for the discharge of steam from the tubular member into the mold cavity.

An alternate construction of the tubular member 108 is indicated in FIG. 4, which shows four tubular sections 116, 118, 120 and 122 each telescoped into another. The upstream end of the section 122 is provided with a fitting 124 for connection to the front wall 94 of the steam manifold, and the downstream end of the section 116 is sealed by a solid rod or plug 126. The tubular sections and the plug preferably are provided with a jacket or coating of antifriction material (not shown), and the tubular sections are provided with perforations 128 for the discharge of steam from the tubular member into the mold cavity.

Whether the tubular member takes the form indicated in FIG. 1 or the form indicated in FIG. 4, the desideratum is a light weight construction in which there is a gradual reduction in outside diameter from the upstream end to the downstream end of the member. The light weight of the tubular members helps keep them centered vertically in the mold channel.

To prepare the apparatus for operation, the bin 80 is filled with granules of a synthetic thermoplastic material containing a heat-expanding agent. The supply of material from the bin 80 to the hopper 68 is controlled by suitable operation of the shutoff slide gate 86. The material in the hopper is kept agitated by the discs 92 actuated by the change spped unit 90. In addition, a roll 130 of synthetic thermoplastic sheet material is mounted at the head of the apparatus, as shown. The sheet material, designated 132, is pulled from the roll 130 in the downstream direction, passed under the bottom wall 100 of the steam manifold and the steam supply tubes 108, and projected into the mold cavity 30. The sheet material is a little more than twice as wide as the depressed surface 24 of the upper run 26 of the belt 10, as a consequence of which the centrally disposed area thereof, designated 134, lines said depressed surface. The two opposite side areas thereof, designated 136, are raised and laid respectively over the downwardly and outwardly diverging opposed sidewalls 102 of the steam manifold and the downwardly and outwardly diverging areas 82 of the walls 72 and 74 of the hopper 68. On the downstream side of the hopper, between the hopper and the head pulley 18, the opposite side areas 136 of the sheet material are folded down so that when the sheet material enters the mold cavity, it is in the form of a sleeve with the marginal areas of the opposite side areas 136 overlapping. The sleeve of sheet material thus formed enters the upstream end of the mold channel suitably loaded with granules of synthetic thermoplastic material, designated 138, drawn from the hopper 68 as the sheet material passes under the hopper 68. The volume control gate 84 may be vertically adjusted to regulate the flow of material from the hopper unto the sheet material.

Steam under pressure enters the manifold through the inlet opening 104 and is discharged therefrom through the outlet openings 106 into the several tubular members 108. Dry heat radiating from the tubular members 108 causes the granules of synthetic thermoplastic material around the tubular members to become softer and expand somewhat, and by the time the partially expanded granules reach the upstream end of the mold channel, expansion of the mass of granules is sufficient to fully open up the sleeve of sheet material and press it against the several walls of the mold cavity. Thus the sheet material enters the mold channel in the form of a sleeve charged with partially expanded granules of a synthetic thermoplastic material. The sleeve is frictionally gripped by the walls of the mold cavity for being drawn into and through the apparatus at the same rate of speed at which the belts 10 and 16 move.

As each successive section of the sleeve moves downstream through the section of the mold channel in which the perforated downstream end portions of the tubular members 108 are located, steam under pressure is discharged through the perforations 114 directly into the partially expanded granules of synthetic thermoplastic material, as a consequence of which the granules expand further and thereby form a coherent foamed agglutinated body fused to the sleeve and the overlapping opposite side marginal areas of the sheet material fuse together. As the sleeve moves downstream, the expanding body of synthetic thermoplastic material tends to frictionally grip the tubular members 108 and thereby retard the movement. This tendency is reduced by tapering the tubular members and providing them with a jacket or coating of Teflon, as described hereinbefore.

Referring particularly to FIG. 6, the finished product is in the form of a flat board with rounded opposite side narrow edges, the board being of any desired length. The core of the board is a coherent foamed agglutinated body 140 provided with laterally spaced longitudinally extending openings 142 running from one end to the other thereof and of a diameter not larger than that of the downstream end portions of the tubular members 108. The core or body 140 is fused to the inner surface of a sleeve 144 of sheet material made of synthetic thermoplastic material, the opposite side marginal areas of the sheet material being overlapped and fused together, as at 146.

Since the sheet of material 132 is imperforate, the steam discharged from the tubular members 108 into the sleeve 144 as aforesaid condenses, and the resulting moisture remains in the porous core 140. The stock or finished product produced by the apparatus may be cut into suitable lengths to provide a number of clothboard reels. The reels are upended, and then suction is applied to the lower ends thereof to draw out the moisture through the openings 142. The reels are for carrying cloth wound thereabout, as a consequence of which they must be light in weight to hold down shipping costs and rugged in use to withstand the torsional and buckling stresses developed during machine winding of cloth on the reel. Preferably, the reel may measure approximately 8 inches × 1 inch × 1 foot 6 inches. The core may be made of lightweight polymeric material, for example, low density foamed polystyrene. The sleeve may be made of polystyrene, for example, 1/16 inch thick. The core is only semi-rigid, but it is rendered rigid by the sleeve in which it is encased and with which it forms a unitary structure.

While in accordance with the provisions of the patent statutes, I have illustrated and described the best embodiment of my invention and the best method of practicing the same now known to me, it will be apparent to those skilled in the art that changes may be made in the form of the apparatus and method described without departing from the spirit and scope of the invention as set forth in the appended claims, and that in some cases certain features of my invention may be used to advantage without a corresponding use of other features. While, as shown and described, the apparatus is particularly arranged for continuous manufacture of the stock from which certain cloth-board reels are made, it will be understood that stock material different in transverse section may be produced.

What I claim is:

1. In apparatus for continuously molding stock consisting of a foamed, coherent agglutinated core of polymeric material tightly enclosed in a sheet of polymeric material, the combination comprising A. lower and upper endless belts each trained about a head and a tail pulley, the head pulley about which the lower belt is trained being disposed upstream from the head pulley about which the upper belt is trained, and each having a depressed outwardly facing surface area intermediate the opposite side marginal areas thereof, the upper run of the lower belt and the lower run of the upper belt being disposed in mutually overlying relation for movement together away from said head pulleys in the downstream direction at the same rate of speed, and being disposed with the depressed surface areas thereof registering and thereby conjointly defining a continuous open ended mold channel having closed longitudinally extending opposite sidewalls, said mold channel being wide and comparatively shallow in transverse section for production of stock in the form of a flat board, B. rollers underlying, overlying and on each side of said mutually overlying runs of the belts, said rollers being operative for supporting and guiding the same and assuring registration thereof as aforesaid, C. a hopper for continuously feeding unexpanded granules of the polymeric material which is to form the core of said stock into said sheet of polymeric material preliminary to folding the same and thereby forming thereof a sleeve enclosing said granules and preliminary to feeding said sleeve and the granules contained thereby into the upstream end of said mold channel, said hopper having an opening in the bottom thereof through which said material is discharged into a section of the upper run of the lower belt extending between said head pulleys, and having laterally spaced opposed sidewalls with lower sections diverging downwardly and outwardly for having the opposite side marginal areas of said sheet material raised and disposed respectively in overlying relation thereto, D. a steam manifold mounted on the upstream side of said hopper, said manifold being provided with laterally spaced opposed sidewalls respectively coplanar with the laterally spaced opposed sidewall areas of the hopper, and being provided with a bottom wall disposed in close spaced overlying relation to the depressed outwardly facing surface of the underlying belt, and E. a plurality of laterally spaced tubular members extending from said steam manifold into the upstream end of said mold channel and downstream deep into the same and disposed with their central axes in a plane coincident with the interface between the upper run of the lower belt and the lower run of the upper belt, said tubular members being tapered gradually from a large diameter at the upstream end thereof to a smaller diameter at the downstream end thereof, being coated on the outside with polytetra-fluoroethylene, being closed at the downstream end thereof, and being perforated for discharge of steam therefrom into the mold channel directly into the granules of polymeric material contained by said sleeve of sheet material.

2. In apparatus for continuously molding stock consisting of a foamed, coherent agglutinated core of polymeric material tightly enclosed in a sheet of polymeric material, the combination comprising A. lower and upper endless belts each trained about a head and a tail pulley, the head pulley about which the lower belt is trained being disposed upstream from the head pulley about which the upper belt is trained, and each having a depressed outwardly facing surface area intermediate the opposite side marginal areas thereof, the upper run of the lower belt and the lower run of the upper belt being disposed in mutually overlying relation for movement together away from said head pulleys in the downstream direction at the same rate of speed, and being disposed with the depressed surface areas thereof registering and thereby conjointly defining a continuous open ended mold channel having closed longitudinally extending opposite sidewalls, B. means for supporting and guiding said mutually overlying runs of said belts thereby to assure registration thereof as aforesaid, C. a hopper for continuously feeding unexpanded granules of the polymeric material which is to form the core of said stock onto said sheet of polymeric material preliminary to folding the same and thereby forming thereof a sleeve enclosing said granules and preliminary to feeding said sleeve and the granules contained thereby into the upstream end of said mold channel, said hopper having an opening in the bottom thereof through which said material is discharged onto a section of the upper run of the lower belt extending between said head pulleys, and having laterally spaced opposed sidewalls with lower sections diverging downwardly and outwardly for having the opposite side marginal areas of said sheet material raised and disposed respectively in overlying relation thereto, D. a steam manifold on the upstream side of said hopper, said manifold being provided with laterally spaced opposed sidewalls respectively coplanar with the laterally spaced opposed sidewall areas of the hopper, and being provided with a bottom wall disposed in close spaced overlying relation to the depressed outwardly facing surface of the lower belt to conform the sheet of material to the shape of the lower part of the mold channel, and E. tubular means extending from said steam manifold downstream across the opening in the bottom of said hopper for engaging said material as it is discharged through said opening from said hopper, said tubular means being arranged for discharge of steam therefrom into said mold channel and directly into the granules of polymeric material contained in said sleeve.

3. In apparatus for continuously molding stock consisting of a foamed, coherent agglutinated core of polymeric material tightly enclosed in a sheet of polymeric material, the combination comprising A. lower and upper endless belts each trained about a head and a tail pulley, the head pulley about which the lower belt is trained being disposed upstream from the head pulley about which the upper belt is trained, and each having a depressed outwardly facing surface area intermediate the opposite side marginal areas thereof, the upper run of the lower belt and the lower run of the upper belt being disposed in mutually overlying relation for movement together away from said head pulleys in the downstream direction at the same rate of speed, and being disposed with the depressed surface areas thereof registering and thereby conjointly defining a continuous open ended mold channel having closed longitudinally extending opposite sidewalls, B. means for supporting and guiding said mutually overlying runs of said belts thereby to assure registration thereof as aforesaid, C. a hopper for continuously feeding unexpanded granules of the polymeric material which is to form the core of said stock onto said sheet of polymeric material preliminary to folding the same and thereby forming thereof a sleeve enclosing said granules and preliminary to feeding said sleeve and the granules contained thereby into the upstream end of said mold channel, said hopper having an opening in the bottom thereof through which said material is discharged onto a section of the upper run of the lower belt extending between said head pulleys, D. a steam manifold on the upstream side of said hopper provided with laterally spaced opposed sidewalls diverging downwardly and outwardly for having the opposite side marginal areas of said sheet material raised and disposed respectively in overlying relation thereto, and provided with a bottom wall disposed in close spaced overlying relation to the depressed outwardly facing surface of the lower belt to conform the sheet of material to the shape of the lower part of the mold channel, and E. tubular means extending from said steam manifold downstream across the opening in the bottom of said hopper for engaging said material as it is discharged through said opening from said hopper, said tubular means being arranged for discharge of steam therefrom into said mold channel and directly into the granules of polymeric material contained in said sleeve.

* * * * *

UNITED STATES PATENT AND TRADEMARK OFFICE
CERTIFICATE OF CORRECTION

PATENT NO. : 3,917,439
DATED : NOVEMBER 4, 1975
INVENTOR(S) : JOSEPH T. YOVANOVICH

It is certified that error appears in the above-identified patent and that said Letters Patent are hereby corrected as shown below:

COLUMN 6, lines 55 and 62, in each, "into" should be --onto--.

Signed and Sealed this twenty-third Day of March 1976

[SEAL]

Attest:

RUTH C. MASON
Attesting Officer

C. MARSHALL DANN
Commissioner of Patents and Trademarks